(12) United States Patent
Groschel et al.

(10) Patent No.: US 7,886,760 B2
(45) Date of Patent: Feb. 15, 2011

(54) ELECTROMAGNETIC ADJUSTMENT UNIT

(75) Inventors: Josef Groschel, Gossweinstein (DE); Christoph Ross, Bamberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1205 days.

(21) Appl. No.: 11/460,351

(22) Filed: Jul. 27, 2006

(65) Prior Publication Data

US 2007/0017587 A1 Jan. 25, 2007

(30) Foreign Application Priority Data

Jul. 27, 2005 (DE) .................. 10 2005 034 939

(51) Int. Cl.
F15B 13/044 (2006.01)
F16K 31/06 (2006.01)

(52) U.S. Cl. .................. 137/315.03; 137/315.09; 137/625.65; 335/297; 403/282

(58) Field of Classification Search ............ 137/625.65, 137/909, 315.03, 315.09; 251/129.15; 335/297; 403/282

See application file for complete search history.

(56) References Cited

U.S. PATENT DOCUMENTS

| 2,735,047 | A | * | 2/1956 | Garner et al. | 335/245 |
| 4,836,248 | A | * | 6/1989 | Stegmeier | 137/625.65 |
| 5,513,832 | A | * | 5/1996 | Becker et al. | 251/129.18 |
| 5,577,534 | A | * | 11/1996 | Ward | 137/625.65 |
| 6,029,703 | A | * | 2/2000 | Erickson et al. | 137/625.61 |
| 6,029,704 | A | * | 2/2000 | Kuroda et al. | 137/625.65 |
| 6,336,470 | B1 | * | 1/2002 | Zapf | 137/625.65 |
| 2005/0189510 | A1 | * | 9/2005 | Golovatai-Schmidt et al. | 251/129.15 |

FOREIGN PATENT DOCUMENTS

| DE | 199 56 160 | 5/2001 |
| DE | 102 52 431 | 5/2004 |

* cited by examiner

*Primary Examiner*—John Rivell
(74) *Attorney, Agent, or Firm*—Volpe and Koenig, P.C.

(57) ABSTRACT

An electromagnetic adjustment unit of a directional control valve is provided. The individual components of the adjustment unit are to be embodied, arranged, and joined such that the assembly expenditure and the costs during the production are reduced to a minimum.

5 Claims, 4 Drawing Sheets

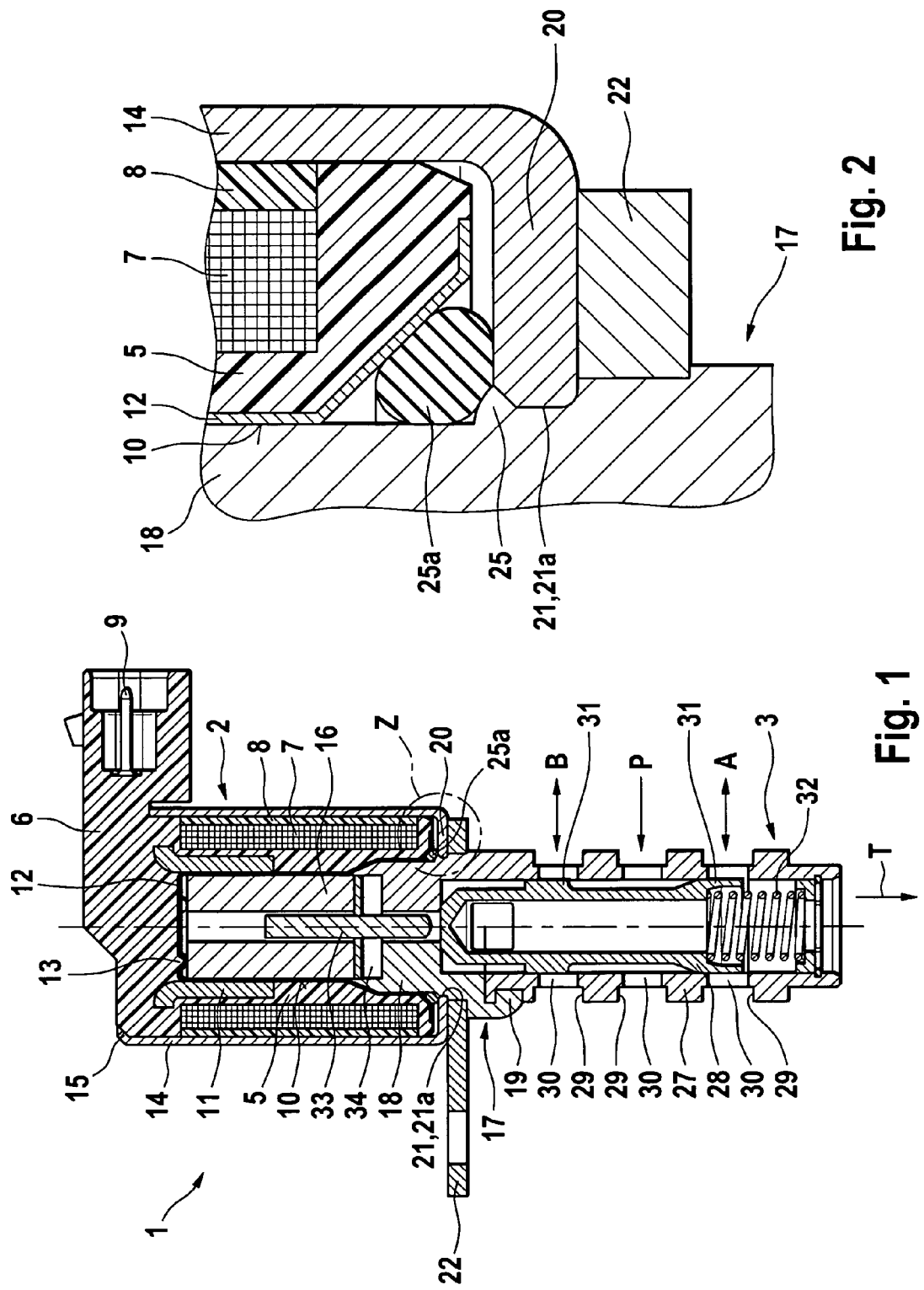

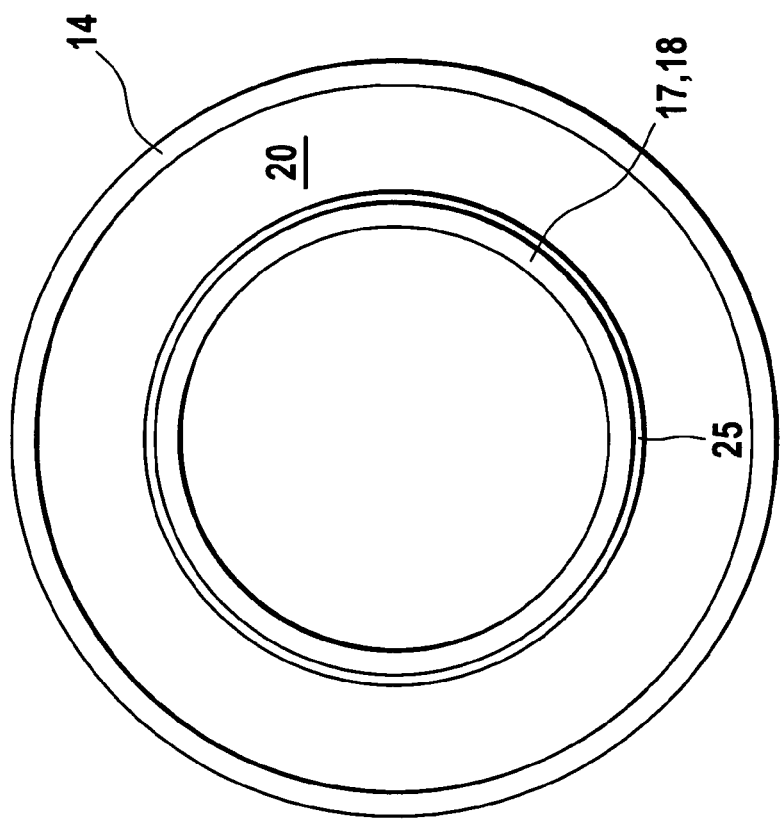
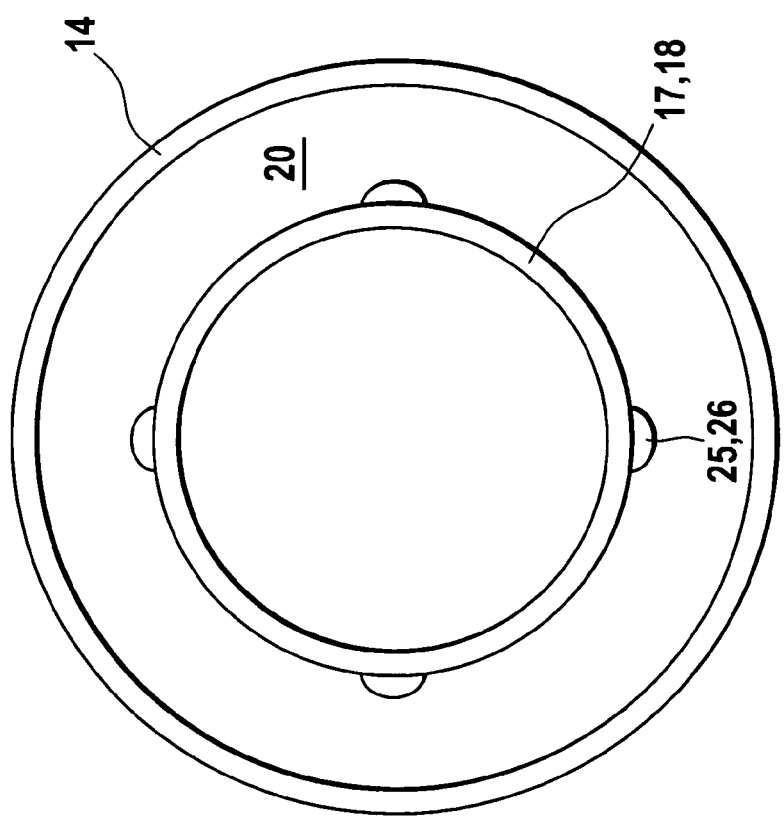

ELECTROMAGNETIC ADJUSTMENT UNIT

BACKGROUND

The invention relates to an electromagnetic adjustment unit of a hydraulic directional control valve with a housing, at least one armature and at least one magnet yoke. The magnet yoke has a tubular section adjacent to an annular section having a greater outer diameter in the axial direction. Within the magnet yoke there is a tappet push rod, which can move axially and which can be displaced by means of the armature. The housing has a pot-like shape with a base, in which there is an opening, through which the tubular section extends into the housing, the outer diameter of the tubular section is at least approximately adapted to the diameter of the opening, and the base is supported indirectly or directly on the annular section.

Such directional control valves are used in internal combustion engines, for example, for controlling hydraulic camshaft adjusters or switchable cam followers. The directional control valves comprise an electromagnetic adjustment unit and a valve section. The valve section represents the hydraulic section of the directional control valve, wherein at least one supply connection, at least one working connection, and one tank connection are formed on the hydraulic section. By means of the electromagnetic adjustment unit, certain connections of the valve section can be selectively connected to each other hydraulically and in this way the flows of pressurized medium are guided.

For the use of a directional control valve to control a camshaft adjuster, in the normal case this valve is formed as a 4/3 proportional directional control valve. Such a proportional valve is disclosed, for example, in DE 199 56 160. In this case, the electromagnetic adjustment unit is composed of a first magnet yoke, a coil, a second magnet yoke, a housing, an armature, and a connection element, which receives an electrical plug connection used for supplying power to the coil.

The valve section is composed of a valve housing and a control piston that can be displaced axially therein. The valve housing is arranged within a receptacle opening of the second magnet yoke and is connected to this yoke so that it is fixed in position. On the outer jacket surface of the valve housing, there are four annular grooves, which are used as pressurized medium connections. Openings are formed in the groove bottoms of the annular grooves, whereby pressurized medium can be led into the interior of the valve housing. In the interior of the valve housing, there is a control piston that can be displaced axially, wherein the outer diameter of the control piston is adapted to the inner diameter of the valve housing. In addition, annular grooves are also formed on the control piston. Adjacent pressurized medium connections can be connected to each other via these annular grooves.

The coil and the first and second magnet yokes are arranged coaxial relative to each other within the housing of the electromagnetic adjustment unit. The first and the second magnet yoke are offset relative to each other in the axial direction. In the region between the first and the second magnet yoke, there is the armature radially within the magnet yokes, wherein this armature is surrounded by the coil in the radial direction. The armature, the housing, the first and the second magnet yokes form a flow path for the magnetic flux lines, which are generated by sending current through the coil.

By sending current through the coil, the armature is forced in the direction of the second magnet yoke, wherein this motion is transferred to the control piston by means of a tappet push rod attached to the armature. This piston is now moved in the axial direction against a spring supported against the valve housing.

For the most part, directional control valves for controlling switchable cam followers are embodied as switching valves. Such a switching valve is known in a configuration as a 3/2 switching valve, for example, from DE 102 52 431 A1. The electromagnetic adjustment unit comprises, in turn, a housing, an armature, a connection element, and a first and a second magnet yoke. The function and the configuration of the electromagnetic adjustment unit are in broad parts analogous to that of the proportional valve.

In this case, a supply connection, a working connection, and a tank connection are formed on the valve section. The working connection communicates via openings, which are each formed as valve seats, both with the supply connection and also with the tank connection. Furthermore, within the valve housing there is a control piston, on which two closing elements are formed. Each closing element can block or open the pressurized medium flow through one of the valve seats depending on the position of the control piston within the valve housing. Depending on the axial position of the control piston, the working connection can be connected selectively to the supply connection or to the tank connection. The axial position of the control piston is fixed relative to the second magnet yoke, in turn, over the axial position of the armature.

The assembly of the electromagnetic adjustment unit produces relatively high assembly expenditure, whereby higher costs arise, due to the plurality of components, which must be positioned and fixed relative to each other.

SUMMARY

Therefore, the invention is based on the objective of avoiding these disadvantages and thus creating an electromagnetic adjustment unit of a directional control valve, wherein its assembly expenditure is minimized and thus its manufacturing costs are reduced. Here, special attention should be placed on simple positioning of the components and economical fixing of the components.

According to the invention, this objective is met in that the base and the tubular section are fixed to each other by means of at least one press-fit section. In this way, the directional control valve can be embodied as a proportional valve or as a switching valve.

By shaping the magnet yoke holding the tappet push rod with a tubular section, which engages through an opening formed in a base of the pot-shaped housing, the two components can be easily positioned radially relative to each other. The annular section with a greater outer diameter of the magnet yoke on one end of the tubular section also fixes the position of the housing relative to the magnet yoke in the axial direction. Thus, these two components are fixed in the axial and radial direction during the production of the stationary connection between these two components. The fixing of the two components relative to each other by means of press-fitting represents an economical method.

In one advantageous embodiment of the invention, the press-fit section is realized by at least one material mass, which is formed on the tubular section and which at least partially covers one edge of the opening in the radial direction. Here, for forming the press-fit section, material of the tubular section of the magnet yoke can be displaced in the axial direction towards the base.

During or after the joining process of the two parts, a tubular swage is inserted into the radial intermediate space between the magnet yoke and the housing, with the inner diameter of the swage being shaped at least in parts smaller than the outer periphery of the tubular section of the magnet yoke. In this way, material is removed from the outer periphery of the tubular section and displaced in a form-fitting way to the joint between the housing and the tubular section. The advantage of this procedure is that the press-fitting process can be realized by a simple method, an exact centering of the housing on the magnet yoke is guaranteed, and the joining and fixing can be performed in one processing step.

In addition, the press-fit section can be realized over the entire periphery of the tubular section.

In this case, the press-fit section is realized by means of a tubular swage with a round cylindrical inner sleeve surface, whose inner diameter is smaller than the outer diameter of the tubular section of the magnet yoke. In this way, a material bead surrounding the joint between the housing and the tubular section is formed in the peripheral direction, whereby a highly stable connection is generated.

Alternatively, the press-fit section can be realized with at least two press-fit points, which are spaced apart in the peripheral direction and which are distributed on the periphery of the tubular section. In this case, the press-fitting tool has a tubular shape with a round cylindrical inner sleeve surface, whose inner diameter corresponds to or is larger than the outer diameter of the tubular section of the magnet yoke. Furthermore, several projections, which extend radially inwards and which are spaced apart in the peripheral direction, are formed on the inner sleeve surface, wherein their radial spacing is smaller than the outer diameter of the tubular section of the magnet yoke. Instead of a bead extending in the peripheral direction, in this case several press-fit points are formed. Through such a procedure, the force necessary for producing the connection can be reduced.

BRIEF DESCRIPTION OF THE DRAWINGS

Additional features of the invention emerge from the following description and from the drawings, in which embodiments of the invention are shown in a simplified form. Shown are FIG. 1 is a schematic view of a first embodiment of an electromagnetic adjustment unit according to the invention, using the example of a 4/3 directional proportional control valve, FIG. 2 is the detail Z from FIG. 1, FIG. 4 is a top view of the electromagnetic adjustment unit along the arrow V from FIG. 1a, FIG. 5 is a top view analogous to FIG. 4 with a differently shaped press-fit section.

DETAILED DESCRIPTION OF THE PREFERRED EMBODIMENTS

Figure 1A:
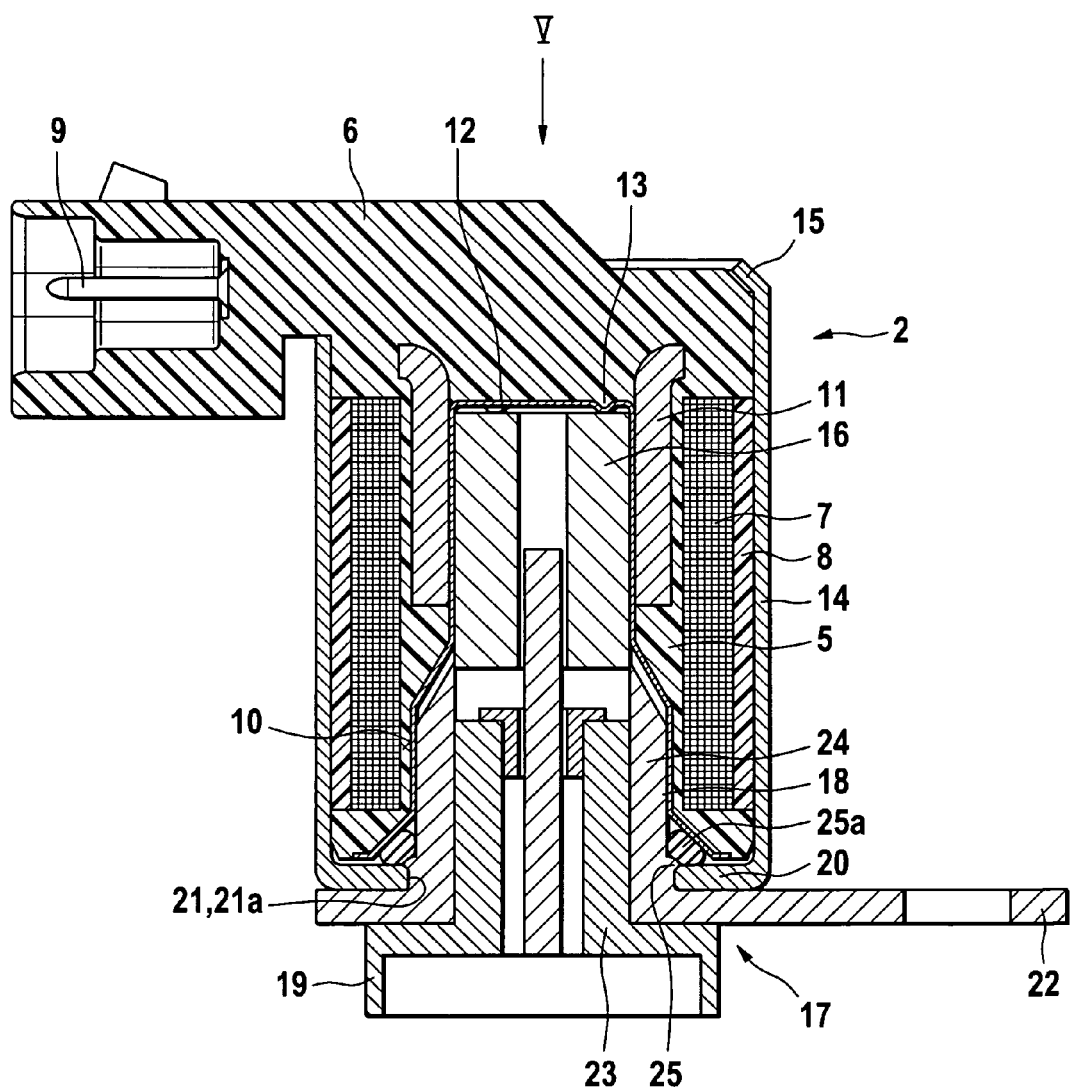
FIG. 1a is a view of a second embodiment of an electromagnetic adjustment unit according to the invention.

FIG. 1 shows a first embodiment of an electromagnetic adjustment unit 2 according to the invention, using the example of a directional control valve 1 embodied as a 4/3 directional proportional control valve. The directional control valve 1 has an electromagnetic adjustment unit 2 and a valve section 3.

The electromagnetic adjustment unit 2 has a coil body 5 and a connection element 6 formed in one piece with this coil body. The coil body 5 supports a coil 7 comprising several windings of a suitable wire. The radially outer surface of the coil 7 is surrounded by a sleeve-shaped material layer 8, which comprises a non-magnetizable material. The material layer 8 can comprise, for example, a suitable plastic and can be injection molded onto the wound coil 7. Within the connection element 6, an electrical plug connection 9 is held, by means of which the coil 7 can be supplied with current.

The coil body 5 is formed with an essentially cylindrical, blind hole-like recess 10, which is arranged concentric to the coil 7. In addition, the coil body 5 and the connection element 6 on the base-side end of the recess 10 has a sleeve-shaped first magnet yoke 11. Within the recess 10 there is a pot-shaped armature guide sleeve 12, wherein its outer contours are adapted to the inner contours of the recess 10. The base-side end of the armature guide sleeve 12 is provided with stops 13 extending axially inwards. In addition, the armature guide sleeve 12 extends in the axial direction along the entire recess 10, wherein this sleeve at least partially surrounds the coil body 5 at its opening in the radial direction.

The coil body 5 is arranged within a pot-shaped housing 14. The open end of the housing 14 projects over the connection element 6 in the axial direction, wherein this element and thus the coil body 5 are fixed by means of an edge connection 15 within the housing 14.

Within the armature guide sleeve 12 there is an armature 16 that is displaceable in the axial direction. Here, the outer diameter of the armature 16 is adapted to the inner diameter of the armature guide sleeve 12. The displacement path of the armature 16 is limited in one direction by the stops 13 and in the other direction by a second magnet yoke 17.

The second magnet yoke 17 has a tubular section 18 and an annular section 19 adjacent to this tubular section in the axial direction. The tubular section 18 extends through an opening 21 formed in the base 20 of the housing 14 into the armature guide sleeve 12 arranged in the recess 10 of the coil body 5. Here, the outer diameter of the tubular section 18 is adapted to the diameter of the opening 21 possibly with play. The inner diameter of the axial end of the tubular section 18, which faces the armature 16, is larger than the outer diameter of the armature 16. Thus, the armature can be inserted into this section. In addition, the outer jacket surface of the tubular section 18 is conical in the direction of the armature 16.

The housing 14 is supported by a mounting flange 22 on the annular section 19. The mounting flange 22 is used for fixing the directional control valve 1 on a surrounding construction (not shown).

The second magnet yoke 17 can be formed as a one-piece component in FIG. 1. An alternative embodiment is shown in FIG. 1a. In this embodiment, the second magnet yoke 17 comprises two components, the pole core 23, and a sleeve-shaped projection 24 formed in one piece with the mounting flange 22.

In FIG. 2, the joint between the housing 14 and the second magnet yoke 17 is shown. This joint involves a press-fit section 25. This can be realized, for example, in that after the housing 14 is positioned on the second magnet yoke 17, material is displaced from the outer peripheral surface of the second magnet yoke 17 in the axial direction towards the housing 14 and is brought in a form-fitting way into the joint between these two components. Here, material masses are formed on the tubular section 18 in the region of the joint, which extend in the radial direction outwards over an edge 21a of the opening 21. In this way, a functionally reliable and economical connection is realized between the housing 14 and the second magnet yoke 17. In addition, the housing 14 is centered by this connection method to the second magnet yoke 17, in the case that the outer diameter of the tubular section 18 and the diameter of the opening 21 are realized with little play. In this case, the material is forced into the intermediate space between these components during the press-fitting process and thus play is eliminated.

Between the tubular section 18 of the second magnet yoke 17, the base 20 of the housing 14, and the armature guide sleeve 12, there is a sealing ring 25a. This prevents pressurized medium, as a rule, motor oil, which penetrates into the electromagnetic adjustment unit 2, from reaching the coil body 5 in interaction with the armature guide sleeve 12, whereby this coil body is protected from damage by the pressurized medium.

The production of the press-fit section 25 is realized by means of a tubular swage, which is to be moved along the outer sleeve surface of the second magnet yoke 17 in the axial direction towards the housing 14. Here, the inner diameter of the swage is smaller than the outer diameter of the second magnet yoke 17. In this case, the press-fit section 25 is formed as an annular material bead surrounding the second magnet yoke 17. This is shown schematically in FIG. 5. FIG. 5 shows a top view of the electromagnetic adjustment unit 2 from FIG. 1a along the arrow V, wherein only the housing 14 and the second magnet yoke 17 are shown.

An alternative connection method is provided in adapting the inner diameter of the swage to the outer diameter of the second magnet yoke 17 or forming it slightly larger, with bulges extending inwards being provided on the swage in the radial direction. In contrast to the embodiment shown in FIG. 5, this does not lead to a bead surrounding the second magnet yoke 17 in the peripheral direction, but instead to discrete press-fit points 26 spaced apart in the peripheral direction, as shown in FIG. 4.

As shown in FIG. 1, the valve section 3 of the directional control valve 1 embodied as a ⅘ directional proportional control valve comprises a valve housing 27 and a control piston 28. The valve housing 27 can be formed either in one piece with the second magnet yoke 17 (right side of the drawing) or as a separate component (left side of the drawing). In the case of a separate construction of the valve housing 27, this is connected, for example, by means of a screw, weld, edged, or similarly acting connection method to the second magnet yoke 17. Several annular grooves 29, which communicate with the interior of the essentially hollow cylindrical valve housing 27 via recesses 30 formed in the groove bases of the annular grooves 29, are formed on the outer surface of the valve housing 27. The annular grooves 29 and the opening facing away from the electromagnetic adjustment unit 2 in the valve housing 27 are used as pressurized medium connections A, B, P, T. The middle annular groove 29, which is used as supply connection P, communicates via a not-shown pressurized medium line to a similarly not-shown pressurized medium pump. The two outer annular grooves 29, which are used as working connections A, B, each communicate via similarly not-shown pressurized medium lines with a pressure chamber or with a group of oppositely acting pressure chambers of a similarly not-shown camshaft adjuster. The axial connection (tank connection) T communicates with a similarly not-shown pressurized medium reservoir.

A control piston 28 is axially displaceable within the valve housing 27. Control sections 31 formed as annular connecting pieces are formed on the outer surface of the control piston 28. The outer diameter of the control sections 31 is adapted to the inner diameter of the valve housing 27. Through suitable axial positioning of the control piston 28 relative to the valve housing 27, adjacent pressurized medium connections A, B, P can be connected to each other. Each working connection A, B not connected to the supply connection P is simultaneously connected to the tank connection T. In this way, pressurized medium can be fed to the individual pressure chambers of the camshaft adjuster or can be discharged from these chambers.

The control piston 28 is charged on one end with the force of a spring element 32 in the direction of the electromagnetic adjustment unit 2. On the other axial end of the control piston 28 there is a tappet push rod 33, which extends through a bore hole of the second magnet yoke 17 and is connected fixed in position to the armature 16.

In the unpowered state of the coil 7, the control piston 28 is displaced in the direction of the electromagnetic adjustment unit 2 due to the force of the spring element 32.

The housing 14, the first magnet yoke 11, the armature 16, and the second magnet yoke 17 comprise a magnetizable material, while the connection element 6, the tappet push rod 33, the coil body 5, and the armature guide sleeve 12 comprise a non-magnetizable material. In this way, a magnetic flux, which displaces the armature 16 in the direction of the valve section 3, is established by sending current through the coil 7 within the electromagnetic adjustment unit 2 via the armature 16, the first magnet yoke 11, the housing 14, the second magnet yoke 17, and an air gap 34 located between the armature 16 and the second magnet yoke 17. Therefore, the control piston 28 is displaced in the axial direction by means of the tappet push rod 33 against the force of the spring element 32. Through suitable control of the current flowing in the coil 7, the control piston 28 can be set relative to the valve housing 27 at any arbitrary position between two end stops and thus the flows of pressurized medium to or from the pressure chambers of the camshaft adjuster can be regulated.

In the following, the assembly of the electromagnetic adjustment unit 2 is explained. First, the housing 14 is positioned on the first magnet yoke 17. Therefore, because the outer diameter of the tubular section 18 is adapted to the diameter of the opening 21, these components are centered relative to each other. The axial position is fixed by the base 20 and the annular section 19. Subsequent to or in the same processing step, the press-fit section 25 between the base 20 and the second magnet yoke 17 is formed. If there is play between the outer jacket surface of the tubular section 18 and the edge 21a of the opening 21, then in this processing step, the housing 14 is centered relative to the second magnet yoke 17 through material filling. Then the sealing ring 25a is inserted, the armature 16 is placed on the second magnet yoke 17, and the coil body 5 with the connection element 6 and the armature guide sleeve 12 is positioned between the housing 14 and the tubular section 18. The armature 16 is centered by the tappet push rod 33 connected rigidly to it and its outer surface, which interacts with an inner surface of the tubular section 18. The coil body 5 is centered by means of the housing 14 and the tubular section 18. For this purpose, the outer diameter of the coil body 5 and the material layer 8 are adapted to the inner diameter of the housing 14. Furthermore, the inner diameter of the coil body 5 is adapted to the outer diameter of the tubular section 18.

Then the edge connection 15 between the housing 14 and the connection element 6 is created and, for a separate construction of the valve housing 27, the valve section 3 is mounted.

Figure 3:
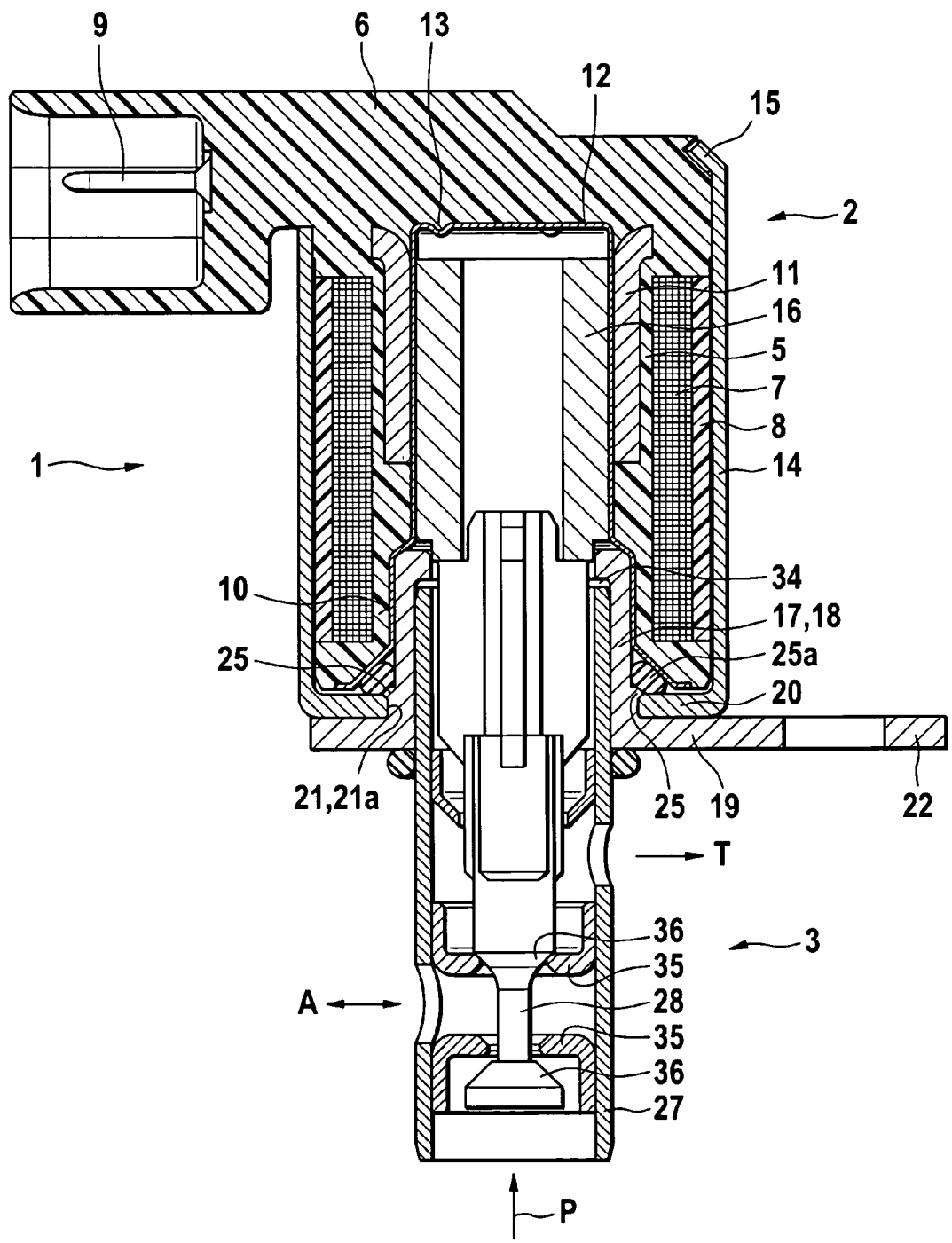
FIG. 3 is a view of a third embodiment of an electromagnetic adjustment unit according to the invention, using the example of a 3/2 directional switching control valve.

FIG. 3 shows another embodiment of an electromagnetic adjustment unit 2 according to the invention, using the example of a directional control valve 1 embodied as a ½ directional switching control valve. Such valves are used, for example, for controlling a locking mechanism of switchable cam followers. This directional control valve 1 comprises, in turn, an electromagnetic adjustment unit 2 and a valve section 3. The electromagnetic adjustment unit 2 is in general terms identical to the adjustment unit 2 shown in FIG. 1 or 1a. In contrast to these embodiments, there is no conical section on the axial end of the second magnet yoke 17, which is facing the armature 16. This is used in the first two embodiments for representing an electromagnetic adjustment unit 2 with a linear characteristic line. In the embodiment shown in FIG. 3, such a linear connection is not necessary, because this directional control valve 1 uses only two control states, namely an unpowered state and a maximum powered state.

The valve section 3 comprises, in turn, a valve housing 27 and a control piston 28, which is displaceable axially therein. In contrast to the embodiment shown in FIG. 1, there are only three pressurized medium connections A, B, T on the valve housing 27 in this embodiment. Within the valve housing 27 there are two valve seats 35, with each valve seat 35 able to interact with a closing body 36 formed on the control piston 28.

In FIG. 3, the directional control valve 1 is shown in the powered state. Due to the magnetic flux generated by the coil 7, the armature 16 and thus the control piston 28 is shifted downwards axially in the figure. Consequently, the upper closing body 36 closes the upper valve seat 35, whereby the connection between the working connection A and the tank connection T is blocked, while pressurized medium can flow from the supply connection P via the open lower valve seat 35 to the working connection A. In the unpowered state of coil 7, there is no magnetic force on the armature 16, whereby the control piston 28 is shifted upwards in the axial direction by the force of the pressurized medium flow on the supply connection P. In this way, the lower closing body 36 contacts the lower valve seat 35, whereby the connection between the supply connection P and the working connection A is disrupted and simultaneously the connection between the working connection A and the discharge connection T is created via the upper valve seat 35.

In this embodiment, the connection between the housing 14 and the second magnet yoke 17 is created using the same means and methods as in the embodiments shown in FIG. 1 or 1a.

Naturally, the configuration of an electromagnetic adjustment unit 2 according to the invention can also be used in directional control valves 1, in which the valve section 3 is not connected rigidly to the adjustment unit 2, but instead the components are arranged without a fixed connection in the axial direction relative to each other. Such directional control valves 1 are used, for example, as a central valve for camshaft adjuster, in which the valve section 3 is arranged within a camshaft and rotates with the camshaft, while the adjustment unit 2 is arranged in the axial direction relative to the camshaft and fixed to a cylinder head or to a cylinder head cap.

REFERENCE SYMBOLS

1 Directional control valve
2 Adjustment unit
3 Valve section
5 Coil body
6 Connection element
7 Coil
8 Material layer
9 Plug connection
10 Recess
11 First magnet yoke
12 Armature guide sleeve
13 Stop
14 Housing
15 Edged connection
16 Armature
17 Second magnet yoke
18 Tubular section
19 Annular section
20 Base
21 Opening
21a Edge
22 Mounting flange
23 Pole core
24 Projection
25 Press-fit section
25a Sealing ring
26 Press-fit point
27 Valve housing
28 Control piston
29 Annular groove
30 Recesses
31 Control section
32 Spring element
33 Tappet push rod
34 Air gap
35 Valve seat
36 Closing body
P Supply connection
T Tank connection
A First working connection
B Second working connection

The invention claimed is:

1. Electromagnetic adjustment unit of a hydraulic directional control valve comprising:
a housing, at least one armature, and at least one magnet yoke,
the at least one magnet yoke has a tubular section, which is adjacent in an axial direction to an annular section of a larger outer diameter,
a tappet push rod, which can be shifted using the armature, is axially displaceable within the magnet yoke,
the housing has a pot shape with a base, in which an opening is provided, through which the tubular section extends into the housing,
an outer diameter of the tubular section is at least approximately adapted to a diameter of the opening,
the base is supported indirectly or directly on the annular section,
the base and the tubular section are fixed to each other by at least one press-fit section,
the press-fit section comprises at least one material mass, which is formed on the tubular section in an axial direction toward the base and at least partially covers one edge of the opening in the base in a radial direction, with the base pressed against the annular section, and
a mounting flange located on a portion of the annular section, and the base located on a mounting bracket, with the press-fit section securing the base and the mounting flange to the housing, wherein the mounting flange is located on a first shoulder defined in the annular section, and the edge of the opening in the base contacts a second, smaller shoulder on the annular section.

2. Electromagnetic adjustment unit according to claim 1, wherein the directional control valve comprises a proportional valve.

3. Electromagnetic adjustment unit according to claim 1, wherein the directional control valve comprises a switching valve.

4. Electromagnetic adjustment unit according to claim 1, wherein the at least one press-fit section is formed over an entire periphery of the tubular section.

5. Electromagnetic adjustment unit according to claim 1, wherein the at least one press-fit section comprises at least two press-fit points, which are spaced apart in a peripheral direction and which are distributed over a periphery of the tubular section.

* * * * *